United States Patent [19]
Danzik et al.

[11] 3,903,138
[45] Sept. 2, 1975

[54] ALKYL SUCCINIC ACID ESTERS OF HYDROXYALKYL SULFONIC ACIDS

[75] Inventors: Mitchell Danzik, Pinole; Ralph House, Richmond, both of Calif.

[73] Assignee: Chevron Research Company, San Francisco, Calif.

[22] Filed: Apr. 8, 1974

[21] Appl. No.: 459,254

[52] U.S. Cl.............................. 260/485 J; 252/557
[51] Int. Cl.².................................... C07C 143/12
[58] Field of Search .................................. 260/485 J

[56] References Cited
UNITED STATES PATENTS
3,689,532   9/1972   Emmons et al. ................. 260/485 J FOREIGN PATENTS OR APPLICATIONS
2,062,257   6/1971   France ............................. 260/485 J Primary Examiner—Anton H. Sutto
Assistant Examiner—E. Jane Skelly
Attorney, Agent, or Firm—G. F. Magdeburger; John Stoner, Jr.; J. T. Brooks

[57] ABSTRACT

Detergent active materials showing low fish toxicity values comprising compounds of the structure

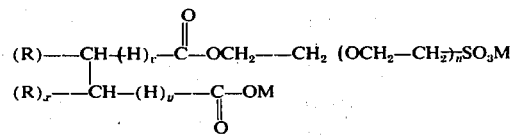

in which R is a substantially linear alkyl group of 16 to 22 carbon atoms, M is hydrogen or a salt-forming cation, $u$, $v$, $x$ and $y$ are 0 or 1, the sum of $u$ and $v$ is 1, the sum of $x$ and $y$ is 1, the sum of $u$ and $x$ is 1, and the sum of $v$ and $y$ is 1; $n$ is 0 to 3.

4 Claims, No Drawings

ALKYL SUCCINIC ACID ESTERS OF HYDROXYALKYL SULFONIC ACIDS

BACKGROUND OF THE INVENTION

1. Field of the Invention

This application is concerned with detergent active materials which are suitable for heavy duty washing in the absence of phosphate builders and show surprisingly low toxicity to fish.

2. Description of the Prior Art

U.S. Pat. 3,086,043 discloses compounds of the formula

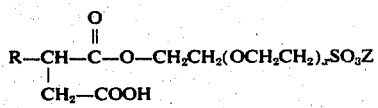

wherein R is an alkenyl group of 8 to 20 carbon atoms, Z is a salt-forming cation and $x$ is an integer 0 to 3. The compounds of this general type have been tested in phosphate-free, heavy-duty washing formulations and have shown good detergent characteristics but have been found to have high fish toxicity characteristics which makes them less than desirable for general use.

SUMMARY OF THE INVENTION

It has now been found that certain alkyl-substituted compounds of structure similar to that disclosed in U.S. Pat. No. 3,086,043 possess excellent heavy-duty washing characteristics in the absence of phosphate builders, and display surprisingly low fish toxicity values. These compounds are of the structure

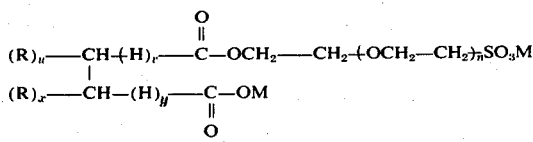

in which R is a substantially linear alkyl group of 16 to 22 carbon atoms, M is hydrogen or a salt-forming cation, $u$, $v$, $x$ and $y$ are 0 or 1, the sum of $u$ and $v$ is 1, the sum of $x$ and $y$ is 1, the sum of $u$ and $x$ is 1, and the sum of $v$ and $y$ is 1, $n$ is 0 to 3.

The compounds of this invention are prepared by the method described in U.S. Pat. No. 3,086,043 with the exception that the double bond on the side chain is reduced. Reduction may be effected before or after reaction of the alkenyl succinic anhydride with the hydroxy alkane or hydroxyalkenoxyalkane sulfonate.

Reduction of the anhydride to the alkyl derivative is preferred. Reduction is preferably effected by conventional methods of catalytic hydrogenation. Hydrogenation catalysts which may be used include Raney nickel, noble metals and various forms of nickel other than Raney nickel such as nickel on kieselguhr, and other supported nickel catalysts. Palladium on carbon and ruthenium on alumina are effective noble metal catalysts.

The amount of catalyst employed in the hydrogenation will usually be in the range of from about 0.01 to 5 percent by weight relative to total reductant.

The hydrogenation reaction is usually carried out at temperatures from about 20°C to 200°C and preferably 70°C to 120°C. At temperatures appreciably above 200°C, unnecessary hydrogenation of hydroxyalkane sulfonates and hydrogenative degradation of the product tend to occur.

Hydrogen pressure during the reaction is not a critical variable. Reduction may be carried out at pressures varying from less than atmospheric to 5,000 psig, but preferably from 30 to 200 psig.

The compounds of this invention are prepared by reacting a hydroxyalkane sulfonate or hydroxyalkanoxyalkane sulfonate with an alkenyl succinic anhydride. This reaction is carried out in a neutral or alkaline solution, preferably in the presence of a basic catalyst.

The reaction is preferably carried out at a temperature of from about 0 to 200°C.

The reaction may be carried out neat or in the presence of an inert solvent. Suitable solvents include non-reactive materials such as dimethylformamide, dimethylsulfoxide, toluene, hexane, isopropyl ether, and dioxane.

Preparation in the absence of a solvent is, however, preferred. When no solvent is employed the reaction temperature range used is from about 130 to 200°C, preferably from about 150° to 170°C. Reaction time will usually vary from about 10 minutes to 2 hours, depending upon the temperature employed.

The resulting half ester contains an un-neutralized carboxyl group. This group is neutralized with a suitable base. Preferably the compound is reacted with a stoichiometric amount or a slight excess of an alkali metal or alkaline earth metal oxide or hydroxide. Sodium hydroxide is preferred.

The following examples illustrate the preparation of the compounds of this invention. The examples are illustrative and nonlimiting.

EXAMPLE I

Hydrogenation of $C_{18}$ Alkenyl Succinic Anhydride

A 20.0 g. portion (0.054 mol) of alkenyl succinic anhydride produced by alkylating maleic anhydride with isomerized octadecene-1 was placed in a 420 ml. Fischer-Porter bottle with 114 g. of hexane and 1 g. of 5% palladium-on-carbon hydrogenation catalyst. The vessel was flushed with nitrogen and heated to 50°–55°C in a water bath. The vessel was pressured to 60 psi and the contents were stirred magnetically. The pressure dropped to 45 psi. The vessel was repressured with hydrogen to 60 psi. This procedure was repeated until the hydrogen uptake was less than 2 pounds per hour. The product was then removed, filtered, and the hexane was stripped from the product. 19.7 g. of product was recovered. IR analysis showed no olefin absorption.

EXAMPLE II

Reaction of Sodium Isethionate with Alkyl Succinic Anhydride

A 5 g. portion of the product of Example I and 2.1 g. portion of sodium isethionate were placed in a reaction flask equipped with stirrer and thermometer. The mixture was heated and stirred in an oil bath for 3 hours at 160°–165°C. The product was cooled and Hyamine titration for surface activity gave a yield of 79%.

EXAMPLE III
Reaction of Sodium Isethionate with Octadecenyl Succinic Anhydride Employing the procedure of Example II the alkenyl (random octadecenyl) succinic anhydride starting material of Example I was reacted with sodium isethionate to produce an unsaturated isethionate ester.

Detergency of the compounds of the present invention is demonstrated by a miniature Terg-O-Tometer test. In this test the effectiveness of the detergents is measured by their ability to remove natural sebum soil from cotton cloth. By this method, small swatches of cloth, soiled by rubbing over face and neck, are washed with test solutions of detergents in a miniature laboratory washer. The washer employed is so constructed that two standard formulations and two test formulations can be used to wash different parts of the same soiled swatch. This arrangement ensures that all formulations are working on identical soil. The quantity of soil removed by this washing procedure is determined by measuring the reflectances of the new cloth, the soiled cloth, and the washed cloth, the results being expressed as per cent soil removal. Because of variations in degree and type of soiling, in water and in cloth, and other unknown variables, the art has developed the method of using relative detergency ratings for comparing detergent effectiveness.

The relative detergency ratings are obtained by comparing and correlating the per cent soil removal results from solutions containing the detergents being tested with the results from two defined standard solutions. The two standard solutions are selected to represent a detergent system exhibiting relatively high detersive characteristics and a system exhibiting relatively low detersive characteristics. The systems are assigned detergency ratings of 6.3 and 2.2, respectively.

By washing portions of each soiled cloth with the standardized solutions, as well as with two test solutions, the results can be accurately correlated. The two standard solutions are identical in formulation but are employed at different hardnesses.

| Standard Solution Formulation Ingredient | Weight % |
| --- | --- |
| Linear Alkylbenzene sulfonate (LAS) | 20 |
| Sodium tripolyphosphate | 40 |
| Water | 8 |
| Sodium Sulfate | 24 |
| Sodium Silicate | 7 |
| Carboxymethylcellulose | 1 |

The standard exhibiting high detersive characteristics (Control B) is prepared by dissolving the above formulation (1.0 g.) in one liter of 50 ppm hard water (calculated as 2/3 calcium carbonate and 1/3 magnesium carbonate). The low detersive standard (Control A) contained the formulation (1.0 g.) dissolved in one liter of 180 ppm water (same basis).

$$RDR = 2.2 + 4.1 \frac{\% \ SR_{Test} - \% \ SR_{Control \ A}}{\% \ SR_{Control \ B} - \% \ SR_{Control \ A}}$$

A further refinement in the determination of relative detergency ratings was developed. In this method, instead of employing two standard formulations, one of the formulations used as one of the four test solutions had a known relative detergency rating (RDR) which had been determined by the above formula. Relative detergency ratings of the other three formulations were then determined by comparing the percent soil removal (SR) of these formulations with that of the known formulation.

Detergency results obtained on a variety of the subject compounds are given in the following table. Each value shown in the average of at least four tests. For comparison, the detergency rating is given for a linear alkylbenzene sulfonate (LAS) (having from 10 to 13 carbon straight chain alkyl groups) both with and without phosphate builder (sodium tripolyphosphate).

Each formulation tested comprised 25 weight percent of the test material along with 1% carboxymethylcellulose, 7% sodium silicate, 8% water, and sufficient sodium sulfate to make 100%. The LAS comparison formulations were prepared in the same way except that in test 1 20% of LAS and 35% of sodium tripolyphosphate were used. The formulations were tested at a concentration in water of 0.10 and 0.15 weight percent. The test results were obtained at a pH of 9.5.

TABLE I
DETERGENT EFFECTIVENESS

| Test No. | Compound Tested | Relative Detergency Ratings At 0.1% (Wt.) Conc. 50 ppm | At 0.15% (Wt.) Conc. 180 ppm |
| --- | --- | --- | --- |
| 1 | LAS with phosphate | 6.2 | 4.3 |
| 2 | LAS without phosphate | 2.8 | 1.2 |
| 3 | Product of Example III | 6.0 | 5.0 |
| 4 | $C_{20}$ alkyl product prepared as in Example III | 5.8 | 5.5 |

As can be seen from these data, the detergent active materials with both saturated and unsaturated side chains are effective in heavy duty laundering.

In order to determine the tolerance of fish for the detergent active compounds of this invention the following routine bio-assay method was employed: "Standard Methods for the Examination of Water and Waste Water", American Public Health Association, pages 458–471, 11th Edition (1960). The test is performed as follows: For each test concentration a 5-gallon jar containing 10 liters of tap water dechlorinated by air blowing was prepared. The test surfactant is added and 10 sticklebacks (Gasterosteidae) are transferred from a fresh water holding tank to the jar. Dead fish are counted and removed at 6 hours, 24 hours, 48 hours, 72 hours and 96 hours. The test concentrations are based on decilog intervals, and the 96-hour median tolerance limit ($TL_m^{96}$) is obtained for graphical or arithmetic interpolation between the highest concentration with more than 50% survival and the lowest concentration with less than 50% survival.

TABLE II

FISH TOLERANCE

| Test No. | Compound Tested | $TL_m^{96}$ (ppm) |
|---|---|---|
| 1 | $C_{18}$ alkyl (product of Example III) | 6.0 |
| 2 | $C_{18}$ alkenyl* | 4.1 |
| 3 | $C_{20}$ alkyl | 2.5 |
| 4 | $C_{20}$ alkenyl** | 0.5 |

*Same as 1 except for unsaturation
**Same as 3 except for unsaturation

As can be seen from these data, the alkyl substituted compounds of this invention have surprisingly high fish tolerance values (corresponding low toxicants) compared to the corresponding alkenyl compounds.

In employing the detergent active materials of this invention in detergent compositions, they may be formulated with additional compatible ingredients being optionally incorporated to enhance the properties of the formulations. Such materials may include but are not limited to anticorrosion, antiredeposition, bleaching and sequestering agents, foam boosters, and certain organic and inorganic alkali metal and alkaline earth metal salts such as inorganic sulfates, carbonates, or borates. Also nonphosphate builders may be included in the composition. Also small quantities of phosphate builders may be included in the compositions although, of course, they are not necessary for effective detergency.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

We claim:
1. A compound of the formula

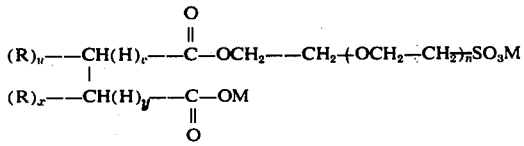

in which R is a substantially linear alkyl group of 16 to 22 carbon atoms, M is hydrogen or an alkali metal or alkaline earth metal cation, $u$, $v$, $x$ and $y$ are 0 or 1, the sum of $u$ and $v$ is 1, the sum of $x$ and $y$ is 1, the sum of $u$ and $x$ is 1, and the sum of $v$ and $y$ is 1, $n$ is 0 to 3.

2. A compound of claim 1 in which R is linear alkyl of 18 carbon atoms.

3. A compound of claim 1 in which M is alkali metal.

4. A compound of claim 3 in which M is sodium.

* * * * *